United States Patent
Alahmadi et al.

(10) Patent No.: US 9,608,803 B2
(45) Date of Patent: Mar. 28, 2017

(54) METHOD FOR DEFENSE AGAINST PRIMARY USER EMULATION ATTACKS IN COGNITIVE RADIO NETWORKS USING ADVANCED ENCRYPTION

(71) Applicant: Board of Trustees of Michigan State University, East Lansing, MI (US)

(72) Inventors: Ahmed S. Alahmadi, East Lansing, MI (US); Mai M. Abdelhakim, East Lansing, MI (US); Jian Ren, Okemos, MI (US); Tongtong Li, Okemos, MI (US)

(73) Assignee: BOARD OF TRUSTEES OF MICHIGAN STATE UNIVERSITY, East Lansing, MI (US)

( * ) Notice: Subject to any disclaimer, the term of this patent is extended or adjusted under 35 U.S.C. 154(b) by 138 days.

(21) Appl. No.: 14/558,832

(22) Filed: Dec. 3, 2014

(65) Prior Publication Data

US 2015/0156012 A1 Jun. 4, 2015

Related U.S. Application Data

(60) Provisional application No. 61/911,603, filed on Dec. 4, 2013.

(51) Int. Cl.
| | |
|---|---|
| H04L 9/06 | (2006.01) |
| H04W 12/12 | (2009.01) |
| H04L 9/32 | (2006.01) |
| H04N 21/235 | (2011.01) |
| H04N 21/442 | (2011.01) |
| H04W 12/02 | (2009.01) |
| H04L 29/06 | (2006.01) |

(52) U.S. Cl.
CPC .......... *H04L 9/0631* (2013.01); *H04L 9/3228* (2013.01); *H04N 21/2351* (2013.01); *H04N 21/44236* (2013.01); *H04W 12/12* (2013.01); *H04L 63/0435* (2013.01); *H04W 12/02* (2013.01)

(58) Field of Classification Search
CPC .... H04W 12/12; H04W 12/02; H04L 9/3228; H04L 63/0435; H04N 21/2351; H04N 21/44236
See application file for complete search history.

(56) References Cited

U.S. PATENT DOCUMENTS

| | | | |
|---|---|---|---|
| 2011/0138183 A1* | 6/2011 | Reddy | H04K 3/25 713/169 |
| 2013/0034229 A1* | 2/2013 | Sauerwald | H04L 9/0822 380/46 |

OTHER PUBLICATIONS

Ahmed Alahmadi et al; Defense Against Primary User Emulation Attacks in Cognitive Radio Networks Using Advanced Encryption; Department of Electrical & Computer Engineering Michigan State University; Aug. 6, 2013; 10 pages; Lansing, Michigan USA.

\* cited by examiner

*Primary Examiner* — Brandon Hoffman
*Assistant Examiner* — Nega Woldemariam
(74) *Attorney, Agent, or Firm* — Howard & Howard Attorneys PLLC

(57) ABSTRACT

A method for defense against primary user emulation attacks in cognitive radio networks includes the steps of generating an advanced encryption standard (AES)-encrypted reference signal with a transmitter for transmitting to at least one receiver. The method also includes the steps of allowing a shared secret between the transmitter and the at least one receiver and regenerating the reference signal at the at least one receiver and using the regenerated reference signal to achieve accurate identification of authorized primary users as well as malicious users.

16 Claims, 9 Drawing Sheets

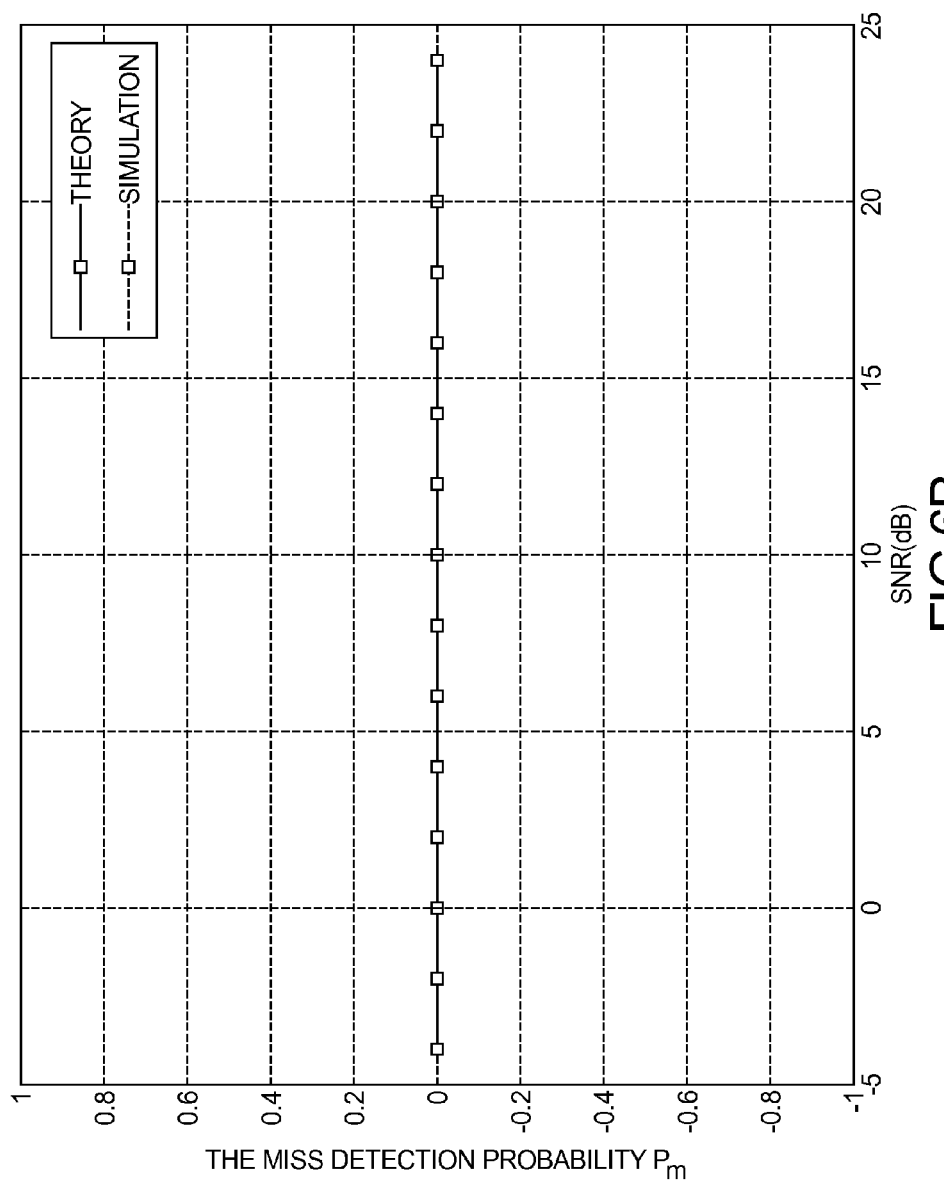

METHOD FOR DEFENSE AGAINST PRIMARY USER EMULATION ATTACKS IN COGNITIVE RADIO NETWORKS USING ADVANCED ENCRYPTION

CROSS-REFERENCE TO RELATED APPLICATION(S)

The present invention claims the priority date of U.S. Provisional Patent Application Ser. No. 61/911,603, filed Dec. 4, 2013.

STATEMENT REGARDING FEDERALLY SPONSORED RESEARCH OR DEVELOPMENT

This invention was made with government support under CNS1217206, CNS1117831, and CNS0746811 awarded by the National Science Foundation. The government has certain rights in the invention.

BACKGROUND OF THE INVENTION

1. Field of the Invention

The present invention relates generally to cognitive radio networks and, more particularly, to a method for defense against primary user emulation attacks in cognitive radio networks using advanced encryption.

2. Description of the Related Art

Along with the ever-increasing demand in high-speed wireless communications, spectrum scarcity has become a serious challenge to the emerging wireless technologies. In licensed networks, the primary users operate in their allocated licensed bands. It is observed that the licensed bands are generally underutilized and their occupation fluctuates temporally and geographically in the range of 15%-85%. Cognitive radio (CR) networks provide a promising solution to the spectrum scarcity and underutilization problems.

CR networks are based on dynamic spectrum access (DSA), where the unlicensed users (also known as the secondary users) are allowed to share the spectrum with the primary users under the condition that the secondary users do not interfere with the primary user's traffic. The CR networks identify the unused bands (white spaces) through "spectrum sensing", then utilize the idle bands for data transmissions. The spectrum sensing function is continuously performed. If a secondary user detected a primary user signal in the band that it operates in, then it must evacuate the band and operate in another white space.

The CR networks have become vulnerable to malicious attacks that could disrupt their operation. A well-known malicious attack is the primary user emulation attack (PUEA). In a PUEA, the malicious users mimic the primary user signal over the idle frequency band(s) such that the authorized secondary users cannot use the corresponding white space(s). This leads to low spectrum utilization and inefficient cognitive network operation.

PUEA have attracted considerable research attention. An analytical model for the probability of a successful PUEA based on the energy detection has been proposed, where the received signal power is modeled as a log-normally distributed random variable. In this method, a lower bound on the probability of a successful PUEA was obtained using Markov inequality. Several methods have been proposed to detect and defend against a PUEA. A transmitter verification scheme (localization-based defense) was proposed to detect a PUEA. A similar approach based on the received signal strength (RSS) was proposed to defend against a PUEA. A Wald's sequential probability ratio test is used to detect a PUEA based on the received signal power.

In most existing methods, the detection of a PUEA is mainly based on the power level and/or direction of arrival (DOA) of the received signal. The basic idea is that: given the locations of the primary TV stations, the secondary user can distinguish the actual primary user's signal from the malicious user's signal by comparing the power level and DOA of the received signal with that of the authorized primary user's signal.

A major limitation with such state-of-the-art methods described above is that they would fail when a malicious user is at a location where it has the same DOA and comparable received power level as that of the actual primary transmitter. Therefore, there is a need in the art for a new method for defense against primary user emulation attacks in cognitive radio networks.

SUMMARY OF THE INVENTION

Accordingly, the present invention is a method for defense against primary user emulation attacks in cognitive radio networks including the steps of generating an advanced encryption standard (AES)-encrypted reference signal with a transmitter for transmitting to at least one receiver. The method also includes the steps of allowing a shared secret between the transmitter and the at least one receiver and regenerating the reference signal at the at least one receiver and using the regenerated reference signal to achieve accurate identification of authorized primary users as well as malicious users.

One advantage of the present invention is that a new method is provided for defense against primary user emulation attacks in cognitive radio networks using advanced encryption. Another advantage of the present invention is that the method can be applied to today's digital TV (DTV) system, including both the first generation and second generation DTV system, as a defense against PUEAs with no change in hardware or system structure except of a plug-in AES chip, which has been commercialized and widely available. Yet another advantage of the present invention is that the method can detect the primary user, as well as the malicious user, with high accuracy under primary user emulation attacks. Still another advantage of the present invention is that the method combats primary user emulation attacks, enables robust system operation, and efficient spectrum sharing. A further advantage of the present invention is that the method can resolve the limitations associated with the location-dependent detection methods.

Other features and advantages of the present invention will be readily appreciated, as the same becomes better understood, after reading the subsequent description taken in conjunction with the accompanying drawings.

BRIEF DESCRIPTION OF THE DRAWINGS

FIGS. 6(a) and 6(b) are diagrammatic views of a false alarm rate $P_f$ and miss detection probability $P_m$ for primary user detection, respectively, of the method, according to the present invention, for defense against primary user emulation attacks in cognitive radio networks.

DESCRIPTION OF THE PREFERRED EMBODIMENT(S)

Figure 8A:
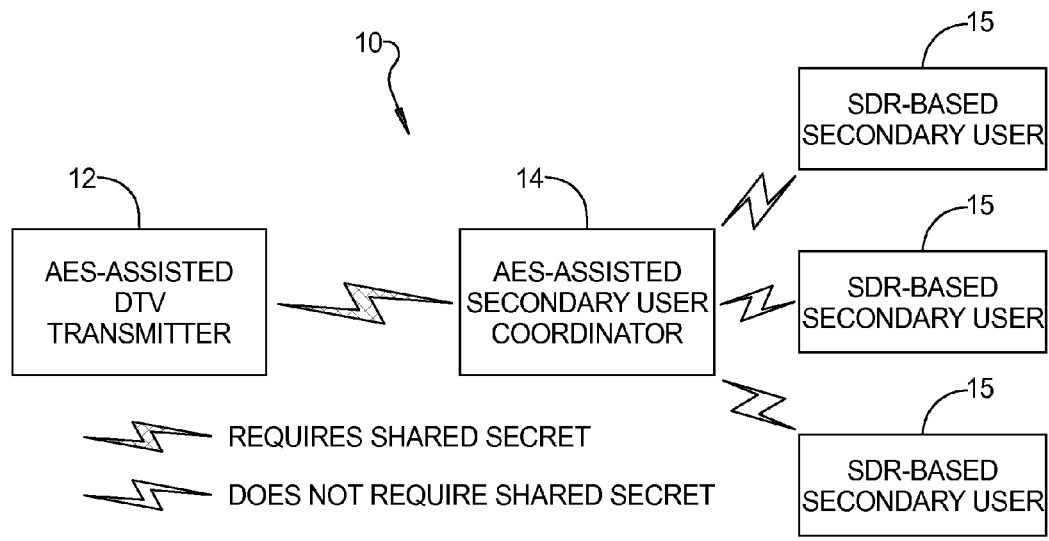
FIGS. 8(a) and 8(b) is a diagrammatic view of one embodiment of a system for use with a method, according to the present invention, for defense against primary user emulation attacks in cognitive radio networks.
Figure 8B:
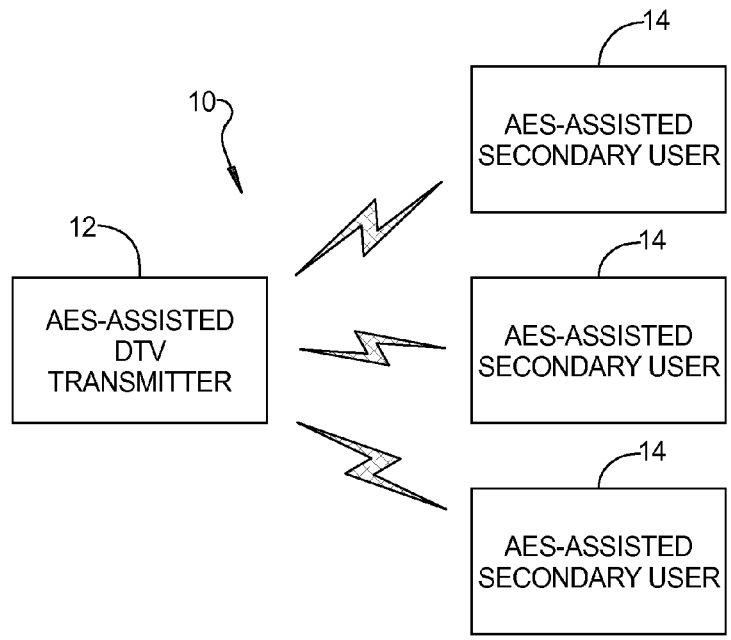

Referring to the drawings and in particular FIGS. 8(a) and 8(b), one embodiment of a system 10 for use with a method, according to the present invention, for defense against primary user emulation attacks in cognitive radio networks, is shown. As illustrated in FIGS. 8(a) and 8(b), the method of the present invention can work in two modes: (1) with an AES-assisted secondary user (SU) coordinator (FIG. 8(a)); or (2) without an AES-assisted secondary user (SU) coordinator (FIG. 8(b)). In one embodiment, the system 10 includes a transmitter such as a digital TV (DTV) transmitter and one or more receivers 14. In both of cases, an AES-based sync bits generator 16 (generally shown in FIG. 2) is included at the DTV transmitter 12, which is also known as the licensed primary user. The generated sync bits play two roles: (i) being used for synchronization between the DTV transmitter 12 and the receivers 14, including both DTV receivers (such as the ordinary DTV set) and secondary user receivers (such as software defined radio (SDR) based communication devices); and (ii) being used as the secure reference signal for primary user identification as well as malicious user detection. It should be appreciated that the AES-based sync bits generator 16 is an advanced encryption standard (AES) chip, which is commercially available and relatively inexpensive.

In Mode (1) of FIG. 8(a), where there is an AES-assisted SU coordinator, then the AES-based sync bits generator is added to the receiver 14 of the coordinator. Using this AES-based sync bits generator 16, the coordinator can regenerate the same secure sync bits, also known as the secure reference signal, generated at the DTV transmitter 12. These secure sync bits are then used to perform synchronization between the AES-assisted DTV transmitter 12 and the receiver 14 of the AES-assisted secondary user (SU) coordinator. The SU coordinator can perform spectral sensing, detect idle spectral spaces, also called white spaces, in the primary user's communications, and assign these whites spaces to the secondary users around it. With the secure reference signal, the AES-assisted secondary user (SU) coordinator can also detect the existence of the malicious user accurately. It should be appreciated that, when an SU coordinator is around, only the SU coordinator needs to perform spectral sensing and primary user/malicious user detection, hence can reduce the burden of each individual SU 15, which is generally a multi-band software defined radio. It should also be appreciated that, at the same time, the SU coordinator can help to avoid the traffic collisions between the SUs.

In Mode (2) of FIG. 8(b), when there is no SU coordinator, then AES-based sync bits generator 16 is added to the receiver 14 of each SU. Each SU then regenerates the same secure sync bits, also known as the secure reference signal, generated at the DTV transmitter 12. These secure sync bits are then used to perform synchronization between the AES-assisted DTV transmitter 12 and the receiver 14 of the AES-assisted secondary users (SUs). With the secure reference signal, the AES-assisted secondary users (SUs) can also perform spectral sensing, and detect the presence or absence of the primary user accurately. It should be appreciated that, at the same time, the AES-assisted secondary users (SUs) can also use the secure reference signal to detect the malicious user accurately.

The receiver 14 of the AES-assisted secondary user or secondary user coordinator includes a correlation detector. The correlation detector evaluates the cross-correlation between a received signal r and a regenerated reference signal s for the primary user detection, and the auto-correlation of the received signal r for the malicious user detection.

Figure 1:
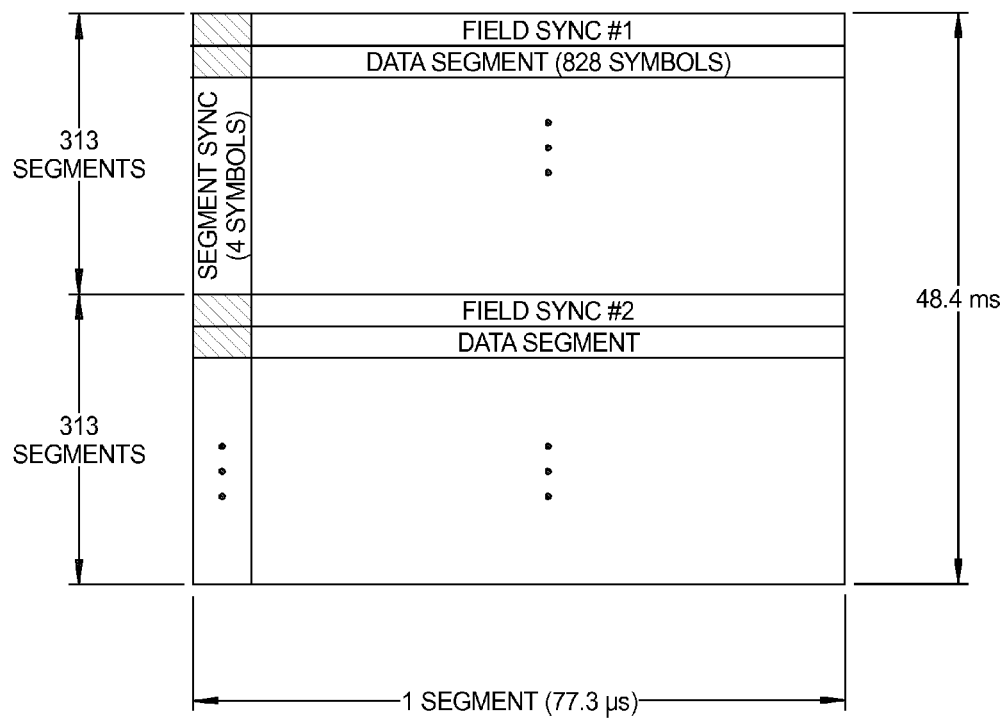
FIG. 1 is a diagrammatic view of an 8-VSB signal frame structure for use with a method, according to the present invention, for defense against primary user emulation attacks in cognitive radio networks.

In the system 10, an eight-level vestigial sideband (8-VSB) modulation is used for transmitting digital signals after they are partitioned into frames by the transmitter 12. The frame structure of the 8-VSB signal is illustrated in FIG. 1. Each frame has two data fields, and each data field has 313 data segments. The first data segment of each data field is used for frame synchronization and channel estimation at the receiver 14. The remaining 624 segments are used for data transmission. Each data segment contains 832 symbols, including 4 symbols used for segment synchronization. The segment synchronization bits are identical for all data segments. In one embodiment, the segment duration is 77.3 μs, hence the overall time duration for one frame is 48.4 ms. It should be appreciated that frame structure of the 8-VSB signal is known in the art and is unchanged in this application.

The system 10 is used for robust and reliable primary and secondary system operations in cognitive radio networks. In the system 10, the primary user generates a pseudo-random (PN) AES-encrypted reference signal that is used as the segment synchronization bits. The synchronization bits in the field synchronization segments remain unchanged for the channel estimation purposes. At the receiving end, the reference signal is regenerated for the detection of the primary user and malicious user. It should be appreciated that synchronization is still guaranteed in the method since the reference bits are also used for synchronization purposes.

In the system 10, the transmitter 12 obtains the reference signal through two steps: first, generating a pseudo-random (PN) sequence, then encrypting the sequence with an AES process provided by the AES-based sync bits generator 16. More specifically, as illustrated in FIG. 2, the PN sequence is first generated using "Linear Feedback Shift Register"

(LFSR) 18 with a secure initialization vector (IV) 20. Maximum-length LFSR sequences can be achieved by tapping the LFSRs according to primitive polynomials. The maximum sequence length that can be achieved with a primitive polynomial of degree m is $2^m-1$. Without loss of generality, a maximum-length sequence is assumed throughout this application.

Figure 2:
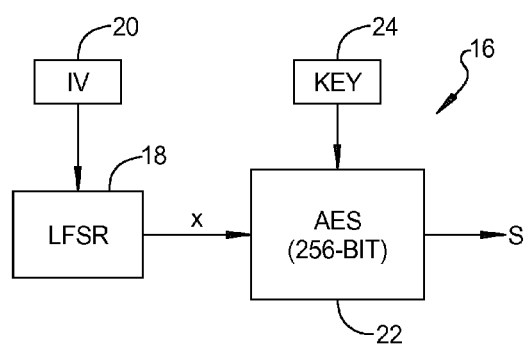
FIG. 2 is a diagrammatic view of a block diagram for generation of a reference signal for the method, according to the present invention, for defense against primary user emulation attacks in cognitive radio networks.

Once the maximum-length sequence is generated, it is used as an input to an AES process 22, as illustrated in FIG. 2. In one embodiment, a 256-bit secret key 24 is used for the AES encryption so that the maximum possible security is achieved.

If the PN sequence is denoted by x, then the output of the AES process 22 is used as the reference signal s, which can be expressed as:

$$s=E(k,x) \quad (1)$$

Here k is the key 24, and E(.,.) denotes the AES encryption operation. The transmitter 12 then places the reference signal s in the synchronization bits of the DTV data segments.

The receiver 14 of the AES-assisted secondary user or secondary user coordinator regenerates the encrypted reference signal by the receiver 14 therein with the secret key and IV 20 that are shared between the transmitter 12 and receiver 14. It should be appreciated that the secret key 24 is available at the receiver 14 and the PN sequence can be regenerated. In the receiver 14, the correlation detector is employed, where for the primary user detection, the receiver 14 evaluates the cross-correlation between the received signal r and the regenerated reference signal s, and for malicious user detection, the receiver 14 further evaluates the auto-correlation of the received signal r. The cross-correlation of two random variables x and y is defined as:

$$R_{xy} = \langle x,y \rangle = E\{xy^*\} \quad (2)$$

Under PUEAs, the received signal can be modeled as:

$$r = \alpha s + \beta m + n, \quad (3)$$

where s is the reference signal, m is the malicious signal, n is the noise, and $\alpha$ and $\beta$ are binary indicators for the presence of the primary user and malicious user, respectively. More specifically, $\alpha=0$ or 1 means the primary user is absent or present, respectively; and $\beta=0$ or 1 means the malicious user is absent or present, respectively.

1. Detection of the Primary User:

To detect the presence of the primary user, the receiver 14 evaluates the cross-correlation between the reference signal s and the received signal r, i.e., $$R_{rs} = \langle r, s \rangle = \alpha \langle s, s \rangle + \beta \langle m, s \rangle + \langle n, s \rangle \quad (4)$$

$$= \alpha \sigma_s^2,$$

where $\sigma_s^2$ is the primary user's signal power, and s, m, n are assumed to be independent of each other and are of zero mean. Depending on the value of a in equation (4), the receiver 14 decides whether the primary user is present or absent.

Assuming that the signals are ergodic, then the ensemble average can be approximated by the time average. In one embodiment, the time average is used to estimate the cross-correlation. The estimated cross correlation $\hat{R}_{rs}$ is given by:

$$\hat{R}_{rs} \triangleq \sum_{i=1}^{N} \frac{r_i \cdot s_i^*}{N}. \quad (5)$$

Where N is the reference signal's length, $s_i$ and $r_i$ denote the ith symbol of the reference and received signal, respectively.

To detect the primary user, the receiver 14 compares the cross-correlation between the reference signal s and the received signal r to a predefined threshold $\lambda$. This results in two cases:

If the cross-correlation is greater than or equal to $\lambda$, that is:

$$\hat{R}_{rs} \geq \lambda, \quad (6)$$

then the receiver 14 concludes that the primary user is present, i.e., $\alpha=1$.

If the cross-correlation is less than $\lambda$, that is:

$$\hat{R}_{rs} < \lambda, \quad (7)$$

Then the receiver 14 concludes that the primary user is absent, i.e., $\alpha=0$.

The detection can be modeled as a binary hypothesis test with the following two hypotheses:

$H_0$: the primary user is absent ($\hat{R}_{rs} < \lambda$)

$H_1$: the primary user is present ($\hat{R}_{rs} \geq \lambda$)

As can be seen from equation (4), the cross-correlation between the reference signal s and the received signal r is equal to 0 or $\sigma_s^2$, in case when the primary user is absent or present, respectively. Following the minimum distance rule, $\lambda = \sigma_s^2/2$ is the threshold for primary user detection.

2. Detection of the Malicious User:

For malicious user detection, the receiver 14 further evaluates the auto-correlation of the received signal r, i.e., $$R_{rr} = \langle r, r \rangle = \alpha^2 \langle s, s \rangle + \beta^2 \langle m, m \rangle + \langle n, n \rangle \quad (8)$$

$$= \alpha^2 \sigma_s^2 + \beta^2 \sigma_m^2 + \sigma_n^2,$$

where $\sigma_m^2$ and $\sigma_n^2$ denote the malicious user's signal power and the noise power, respectively. Based on the value of $\alpha$ from equation (4), $\beta$ can be determined accordingly through equation (8). The following cases result:

$$R_{rr} = \begin{cases} \sigma_s^2 + \sigma_m^2 + \sigma_n^2, & \alpha=1, \beta=1 \\ \sigma_s^2 + \sigma_n^2, & \alpha=1, \beta=0 \\ \sigma_m^2 + \sigma_n^2, & \alpha=0, \beta=1 \\ \sigma_n^2, & \alpha=0, \beta=0 \end{cases} \quad (9)$$

Assuming ergodic signals, the time average to estimate the auto-correlation is used as follows:

$$\hat{R}_{rr} \triangleq \sum_{i=1}^{N} \frac{r_i \cdot r_i^*}{N}. \quad (10)$$

The detection problem can be modeled using four hypotheses, denoted by $H_{\alpha\beta}$, where $\alpha, \beta \in \{0, 1\}$:

$H_{00}$: the MU is absent given that $\alpha=0$ $H_{01}$: the MU is present given that $\alpha=0$ $H_{10}$: the MU is absent given that $\alpha=1$ $H_{11}$: the MU is present given that $\alpha=1$ In one embodiment, an estimated value of α is denoted as $\hat{\alpha}$. The β is estimated after $\hat{\alpha}$ is obtained. To do this, the receiver 14 compares the auto-correlation of the received signal to two predefined thresholds $\lambda_0$ and $\lambda_1$ based on the previously detected $\hat{\alpha}$. More specifically, the receiver 14 compares the auto-correlation of the received signal r to $\lambda_0$ when $\hat{\alpha}=0$, and to $\lambda_1$ when $\hat{\alpha}=1$. That is:

$$\begin{cases} \hat{H}_{00}: \hat{R}_{rr} < \lambda_0, & \text{given that } \hat{\alpha}=0, (\beta=0) \\ \hat{H}_{01}: \hat{R}_{rr} \geq \lambda_0, & \text{given that } \hat{\alpha}=0, (\beta=1) \\ \hat{H}_{10}: \hat{R}_{rr} < \lambda_1, & \text{given that } \hat{\alpha}=1, (\beta=0) \\ \hat{H}_{11}: \hat{R}_{rr} \geq \lambda_1, & \text{given that } \hat{\alpha}=1, (\beta=1) \end{cases} \quad (11)$$

The performance of the detection process for the primary user and malicious user is evaluated through "false alarm rates" and the "miss detection probabilities" to be described.

Analytical Evaluation for Primary User Detection

The performance of the system 10 is analyzed for primary user detection, under $H_0$ and $H_1$, through evaluation of the false alarm rate and the miss detection probability.

It is assumed that the detection of the primary user has a false alarm rate $P_f$ and a miss detection probability $P_m$, respectively. The false alarm rate $P_f$ is the conditional probability that the primary user is considered to be present, when it is actually absent, i.e.

$$P_f = Pr(H_1|H_0) \quad (12)$$

The miss detection probability $P_m$ is the conditional probability that the primary user is considered to be absent, when it is present, i.e., $$P_m = Pr(H_0|H_1) \quad (13)$$

As can be seen from equation (5), $\hat{R}_{rz}$ is the averaged summation of N random variables. Since N is large, then based on the central limit theorem, $\hat{R}_{rs}$ can be modeled as a Gaussian random variable. More specifically, under $H_0$, $\hat{R}_{rs} \sim N(\mu_0, \sigma_0^2)$ and under $H_1$, where $\hat{R}_{rs} \sim N(\mu_1, \sigma_1^2)$, where $\mu_0, \sigma_0,$ and $\mu_1, \sigma_1$, can be derived as follows.

Under $H_0$, the received signal is represented as $r_i = \beta m_{i+} n_i$, where $m_i$ is the ith malicious symbol, and $n_i \sim N(0, \sigma_n^2)$. Then, the mean $\mu_0$ can be obtained as:

$$\mu_0 = \frac{1}{N}\mathbb{E}\left\{\sum_{i=1}^{N}(\beta m_i + n_i)s_i^*\right\} \quad (14)$$
$$= 0.$$

The variance $\sigma_0^2$ can be obtained as:

$$\sigma_0^2 = \mathbb{E}\{|\hat{R}_{rs}|^2\} - |\mu_0|^2 \quad (15)$$
$$= \frac{1}{N}[\beta^2 \sigma_s^2 \sigma_m^2 + \sigma_s^2 \sigma_n^2)].$$

Similarly, under $H_1$, the received signal is represented as $r_i = s_i + \beta m_{i+} n_i$, and the mean $\mu_1$ can be obtained as follows:

$$\mu_1 = \frac{1}{N}\mathbb{E}\left\{\sum_{i=1}^{N}(s_i + \beta m_i + n_i)s_i^*\right\} \quad (16)$$
$$= \sigma_s^2,$$

and $\sigma_1^2$ can be obtained as:

$$\sigma_1^2 = \mathbb{E}\{|\hat{R}_{rs}|^2\} - |\mu_1|^2 \quad (17)$$
$$= \frac{1}{N}[\mathbb{E}\{|\tilde{s}|^4\} + \beta^2 \sigma_s^2 \sigma_m^2 + \sigma_s^2 \sigma_n^2 - (\sigma_s^2)^2],$$

where we assume that $\mathbb{E}\{|s_i|^4\} = \mathbb{E}\{|\tilde{s}|^4\} \forall i$.

Following equation (12), the false alarm rate $P_f$ can be obtained as:

$$P_f = Pr\{\hat{R}_{rs} \geq \lambda | H_0\} \quad (18)$$
$$= \int_{\lambda}^{\infty} \frac{1}{\sqrt{2\pi}\sigma_0} e^{-\frac{(x-\mu_0)^2}{2\sigma_0^2}} dx$$
$$= Q\left(\frac{\lambda - \mu_0}{\sigma_0}\right).$$

Similarly, following equation (13), the miss detection probability $P_m$, can be obtained as:

$$P_m = Pr\{\hat{R}_{rs} < \lambda | H_1\} \quad (19)$$
$$= \int_{-\infty}^{\lambda} \frac{1}{\sqrt{2\pi}\sigma_1} e^{-\frac{(x-\mu_1)^2}{2\sigma_1^2}} dx$$
$$= 1 - Q\left(\frac{\lambda - \mu_1}{\sigma_1}\right).$$

As will be described, when $\lambda = \sigma_0^2/2$, both $P_f$ and $P_m$ are essentially zero, and independent of the SNR values. The underlying argument is that the detection of the primary user is based on $\hat{R}_{rs}$ (see equation (4)), which is independent of both $\sigma_m^2$ and $\sigma_n^2$.

Analytical Evaluation for Malicious User Detection

False Alarm Rate and Miss Detection Probability for Malicious User Detection

The false alarm rate and miss detection probability for the detection of malicious user are evaluated. Define $\check{P}_{f,0}$ and $\check{P}_{f,1}$ as the false alarm rate when $\hat{\alpha}=0$ or $\hat{\alpha}=1$, respectively, $$\check{P}_{f,0} = Pr(\hat{H}_{01}|\hat{H}_{00}), \quad (20)$$

$$\check{P}_{f,1} = Pr(\hat{H}_{11}|\hat{H}_{10}). \quad (21)$$

The overall false alarm rate is given by:

$$\check{P}_f = \hat{P}_0 \check{P}_{f,0} + (1-\hat{P}_0)\check{P}_{f,1}. \quad (22)$$

where $\hat{P}_0$ is the probability that α=0, i.e.

$$\hat{P}_0 = (1-P_f)P(\alpha=0) + P_m P(\alpha=1). \quad (23)$$

As will be described, with the avalanche effect of the AES process 22, the cross-correlation between the reference signal and the received signal is always around $\sigma_s^2$ or 0, depending on whether the primary user is present or absent, respectively. That is, $P_f$ and $P_m$ are negligible, as will be described. Therefore, in the following, it is assumed that $\hat{\alpha} = \alpha$, and no distinction between $\hat{H}_{\alpha\beta}$ and $H_{\alpha\beta}$; it follows that $\hat{P}_0 = P_0 = P(\alpha=0)$ Hence, the overall false alarm rate is given by:

$$\hat{P}_f = P_0 \hat{P}_{f,0} + (1-P_0)\hat{P}_{f,1}. \quad (24)$$

Similarly, the miss detection probabilities can be defined as $\tilde{P}_{m,0}$ and $\tilde{P}_{m,1}$, when the primary user is absent and present, respectively, i.e., $$\tilde{P}_{m,0} = Pr(H_{00}|H_{01}). \tag{25}$$

$$\tilde{P}_{m,1} = Pr(H_{10}|H_{11}). \tag{26}$$

The overall malicious node miss detection probability is defined as:

$$\tilde{P}_m = P_0 \tilde{P}_{m,0} + (1-P_0)\tilde{P}_{m,1}. \tag{27}$$

Since $\hat{R}_{rr}$ is the averaged summation of a large number of random variables, then based on the central limit theorem, $\hat{R}_{rr}$ can be modeled as a Gaussian random variable. The following case results:

$$\begin{cases} \hat{R}_{rr} \sim \mathcal{N}(\mu_{00}, \sigma_{00}^2), & H_{00} \\ \hat{R}_{rr} \sim \mathcal{N}(\mu_{01}, \sigma_{01}^2), & H_{01} \\ \hat{R}_{rr} \sim \mathcal{N}(\mu_{10}, \sigma_{10}^2), & H_{10} \\ \hat{R}_{rr} \sim \mathcal{N}(\mu_{11}, \sigma_{11}^2), & H_{11} \end{cases} \tag{28}$$

where $\mu_{00}$, $\sigma_{00}$, $\mu_{01}$, $\sigma_{01}$, $\mu_{10}$, $\sigma_{10}$, and $\mu_{11}$, $\sigma_{11}$ can be derived as follows. Under $H_{00}$, both the primary user and malicious user are absent, resulting in $r_i = n_i$. It follows that:

$$\sigma_{00}^2 = \mathbb{E}\{|\hat{R}_{rr}|^2\} - |\mu_{00}|^2 \tag{30}$$
$$= \frac{1}{N}\left[\mathbb{E}\{|\tilde{n}|^4\} - (\sigma_n^2)^2\right],$$

and $\sigma_{00}^2$ can be obtained as:

$$\mu_{00} = \frac{1}{N}\mathbb{E}\left\{\sum_{i=1}^{N} n_i n_i^*\right\} \tag{29}$$
$$= \sigma_n^2,$$

where it is assumed that $\mathbb{E}\{|n_i|^4\} = \mathbb{E}\{|\bar{n}|^4\} \forall i$. Similarly, under $H_{01}$, the received signal is represented as $r_i = m_i + n_i$, and the mean $\mu_{01}$ can be obtained as follows:

$$\mu_{01} = \frac{1}{N}\mathbb{E}\left\{\sum_{i=1}^{N} (m_i + n_i)(m_i + n_i)^*\right\} \tag{31}$$
$$= \sigma_m^2 + \sigma_n^2.$$

The variance $\sigma_{01}^2$ can be obtained as:

$$\sigma_{01}^2 = \mathbb{E}\{|\hat{R}_{rr}|^2\} - |\mu_{01}|^2 \tag{32}$$
$$= \frac{1}{N}\left[\mathbb{E}\{|\tilde{m}|^4\} + \mathbb{E}\{|\tilde{n}|^4\} + \mathbb{E}\{2\mathbb{R}\{(\tilde{m})^2(\tilde{n}^*)^2\}\} + 2\sigma_m^2\sigma_n^2 - (\sigma_m^2)^2 - (\sigma_n^2)^2\right],$$

where it is assumed that $\mathbb{E}\{|m_i|^4\} = \mathbb{E}\{|\tilde{m}|^4\}$ and $\mathbb{E}\{2\mathbb{R}\{(m_i)^2(n_i^*)\}\} = \mathbb{E}\{2\mathbb{R}\{(\tilde{m})^2(\tilde{n}^*)^2\}\}$, $\forall i$, where $\mathbb{R}\{x\}$ means the real part of x.

Under $H_{10}$, the received signal is expressed as $r_i = s_i + n_i$ and the mean $\mu_{10}$ can be obtained as follows:

$$\mu_{10} = \frac{1}{N}\mathbb{E}\left\{\sum_{i=1}^{N}(s_i+n_i)(s_i+n_i)^*\right\} \tag{33}$$
$$= \sigma_s^2 + \sigma_n^2,$$

and $|\sigma_{10}|^2$ can be obtained as:

$$\sigma_{10}^2 = \mathbb{E}\{|\hat{R}_{rr}|^2\} - |\mu_{10}|^2 \tag{34}$$
$$= \frac{1}{N}\left[\mathbb{E}\{|\tilde{s}|^4\} + \mathbb{E}\{|\tilde{n}|^4\} + \mathbb{E}\{2\mathbb{R}\{(\tilde{s})^2(\tilde{n}^*)^2\}\} + 2\sigma_s^2\sigma_n^2 - (\sigma_s^2)^2 - (\sigma_n^2)^2\right].$$

Similarly, under $H_{11}$, the received signal is represented as $r_i = s_i + m_i + n_i$, and the mean $\mu_{11}$ can be obtained as follows:

$$\mu_{11} = \frac{1}{N}\mathbb{E}\left\{\sum_{i=1}^{N}(s_i+m_i+n_i)(s_i+m_i+n_i)^*\right\} \tag{35}$$
$$= \sigma_s^2 + \sigma_m^2 + \sigma_n^2.$$

The variance of $\sigma_{11}^2$ can be obtained as:

$$\sigma_{11}^2 = \mathbb{E}\{|\hat{R}_{rr}|^2\} - |\mu_{11}|^2 \tag{36}$$
$$= \frac{1}{N}\big[\mathbb{E}\{|\tilde{s}|^4\} + \mathbb{E}\{|\tilde{m}|^4\} + \mathbb{E}\{|\tilde{n}|^4\} +$$
$$\mathbb{E}\{2\mathbb{R}\{(\tilde{s})^2(\tilde{m}^*)^2\}\} +$$
$$\mathbb{E}\{2\mathbb{R}\{(\tilde{s})^2(\tilde{n}^*)^2\}\} + \mathbb{E}\{2\mathbb{R}\{(\tilde{m})^2(\tilde{n}^*)^2\}\} +$$
$$2\sigma_s^2\sigma_m^2 + 2\sigma_s^2\sigma_n^2 + 2\sigma_m^2\sigma_n^2 -$$
$$(\sigma_s^2)^2 - (\sigma_m^2)^2 - (\sigma_n^2)^2\big].$$

From the discussions above, the following case results:

$$\tilde{P}_{f,0} = P_r\{\hat{R}_{rr} \geq \lambda_0 \mid H_{00}\} \tag{37}$$
$$= Q\left(\frac{\lambda_0 - \mu_{00}}{\sigma_{00}}\right),$$

and $$\tilde{P}_{f,1} = P_r\{\hat{R}_{rr} \geq \lambda_1 \mid H_{10}\} \tag{38}$$
$$= Q\left(\frac{\lambda_1 - \mu_{10}}{\sigma_{10}}\right).$$

Similarly, the following case results:

$$\tilde{P}_{m,0} = P_r\{\hat{R}_{rr} < \lambda_0 \mid H_{01}\} \tag{39}$$
$$= 1 - Q\left(\frac{\lambda_0 - \mu_{01}}{\sigma_{01}}\right),$$

and

-continued $$\tilde{P}_{m,1} = P_r\{\hat{R}_{rr} < \lambda_1 \mid H_{11}\} \quad (40)$$
$$= 1 - Q\left(\frac{\lambda_1 - \mu_{11}}{\sigma_{11}}\right).$$

The overall false alarm rate $\tilde{P}_c$ and miss detection probability $\tilde{P}_m$ can be calculated from equations (24) and (27). That is:

$$\tilde{P}_f = P_0 Q\left(\frac{\lambda_0 - \mu_{00}}{\sigma_{00}}\right) + (1 - P_0) Q\left(\frac{\lambda_0 - \mu_{10}}{\sigma_{10}}\right), \quad (41)$$

and $$\tilde{P}_m = 1 - P_0 Q\left(\frac{\lambda_0 - \mu_{01}}{\sigma_{01}}\right) + (P_0 + 1) Q\left(\frac{\lambda_1 - \mu_{11}}{\sigma_{11}}\right). \quad (42)$$

The optimal thresholds $\lambda_{0,opt}$ and $\lambda_{1,opt}$ that minimize the overall miss detection probability $\tilde{P}_m$ subject to a constraint on the false alarm rate will be described.

The Optimal Thresholds for Malicious User Detection

The optimal thresholds $\lambda_{0,opt}$ an $\lambda_{1,opt}$ that minimize the overall miss detection probability of the malicious node detection are obtained, while maintaining the false alarm rates below a certain threshold $\delta$. This problem can be formulated as follows:

$$\min \tilde{P}_m \quad (43)$$
$$\text{subject to } \tilde{P}_{f,0} \leq \delta,$$
and
$$\tilde{P}_{f,1} \leq \delta.$$

It is noted that the problem formulation above is equivalent to:

$$\min \tilde{P}_{m,0} \quad (44)$$
$$\text{subject to } \tilde{P}_{f,0} \leq \delta,$$
$$\min \tilde{P}_{m,1}$$
$$\text{subject to } \tilde{P}_{f,1} \leq \delta.$$

Thus, it is requested:

$$\tilde{P}_{f,0} = Q\left(\frac{\lambda_0 - \mu_{00}}{\sigma_{00}}\right) \leq \delta, \quad (45)$$

and $$\tilde{P}_{f,1} = Q\left(\frac{\lambda_0 - \mu_{10}}{\sigma_{10}}\right) \leq \delta, \quad (46)$$

which implies that:

$$\lambda_0 \geq \sigma_{00} Q^{-1}(\delta) + \mu_{00}. \quad (47)$$

and $$\lambda_1 \geq \sigma_{10} Q^{-1}(\delta) + \mu_{10}. \quad (48)$$

It should be appreciated that in order to minimize the overall miss detection probability $\tilde{P}_m$, $\lambda_0$ in equation (47), and $\lambda_1$ in equation (48) should be as small as possible. Hence, the thresholds are set to:

$$\lambda_{0,opt} = \sigma_{00} Q^{-1}(\delta) + \mu_{00}, \quad (49)$$

and $$\lambda_{1,opt} = \sigma_{10} Q^{-1}(\delta) + \mu_{10}. \quad (50)$$

By substituting $\lambda_{0,opt}$ and $\lambda_{1,opt}$ in equation (42), the overall miss detection probability is obtained as:

$$\tilde{P}_m = 1 - P_0 Q\left(\frac{\sigma_{00} Q^{-1}(\delta) + \mu_{00} - \mu_{01}}{\sigma_{01}}\right) + \quad (51)$$
$$(P_0 - 1) Q\left(\frac{\sigma_{10} Q^{-1}(\delta) + \mu_{10} - \mu_{11}}{\sigma_{11}}\right).$$

It should be appreciated that for malicious user detection, to minimize the overall miss detection probability $\tilde{P}_m$ subject to the false alarm rate constraints $\tilde{P}_{f,0} \leq \delta$ and $\tilde{P}_{f,1} \leq \delta$, which also ensures that $\tilde{P}_f \leq \delta$, $\lambda_{0,opt} = \sigma_{00} Q^{-1}(\delta) + \mu_{00}$, and $\lambda_{1,opt} = \sigma_{10} Q^{-1}(\delta) + \mu_{10}$ are chosen.

Security and Feasibility of the AES-Assisted DTV Method

Security of the AES-Assisted DTV

As it is well known, AES has been proved to be secure under all known attacks, in the sense that it is computationally infeasible to break AES in real time. In the present invention, this means that it is computationally infeasible for malicious users to regenerate the reference signal. Moreover, the AES process 22 has a very important security feature known as the avalanche effect, which means that a small change in the plaintext or the key yields a large change in the ciphertext.

Because of the avalanche effect of the AES process 22, it is impossible to recover the plaintext given the ciphertext. Actually, even if one bit is changed in the plaintext, the ciphertext will be changed by approximately 50%.

Figure 3:
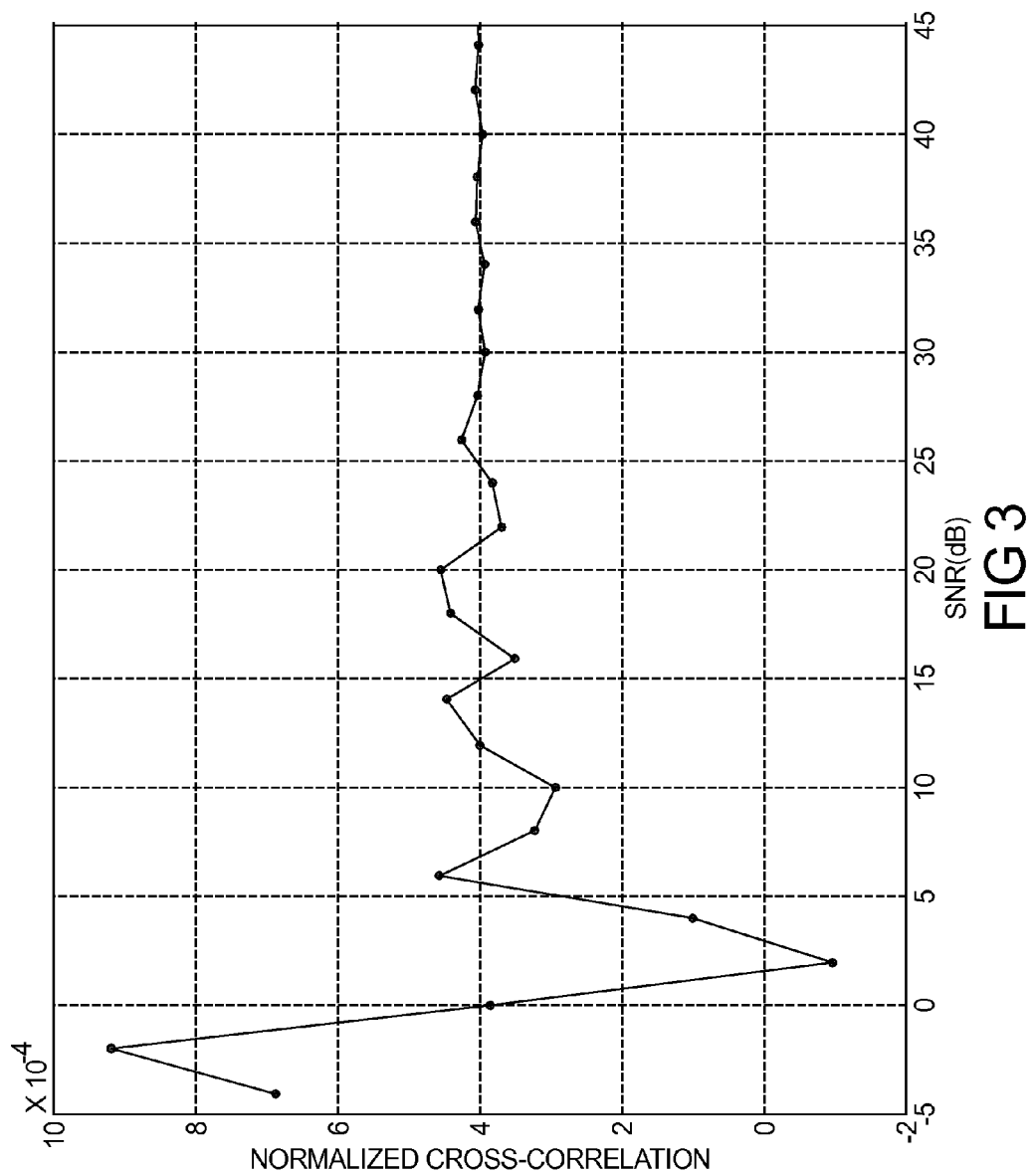
FIG. 3 is a view of a graph illustrating normalized cross-correlation between the reference signal and noisy versions of a malicious user's signal where the cross-correlation values are in the order of $10^{-4}$, which is close to 0, for the method, according to the present invention, for defense against primary user emulation attacks in cognitive radio networks.
Figure 4:
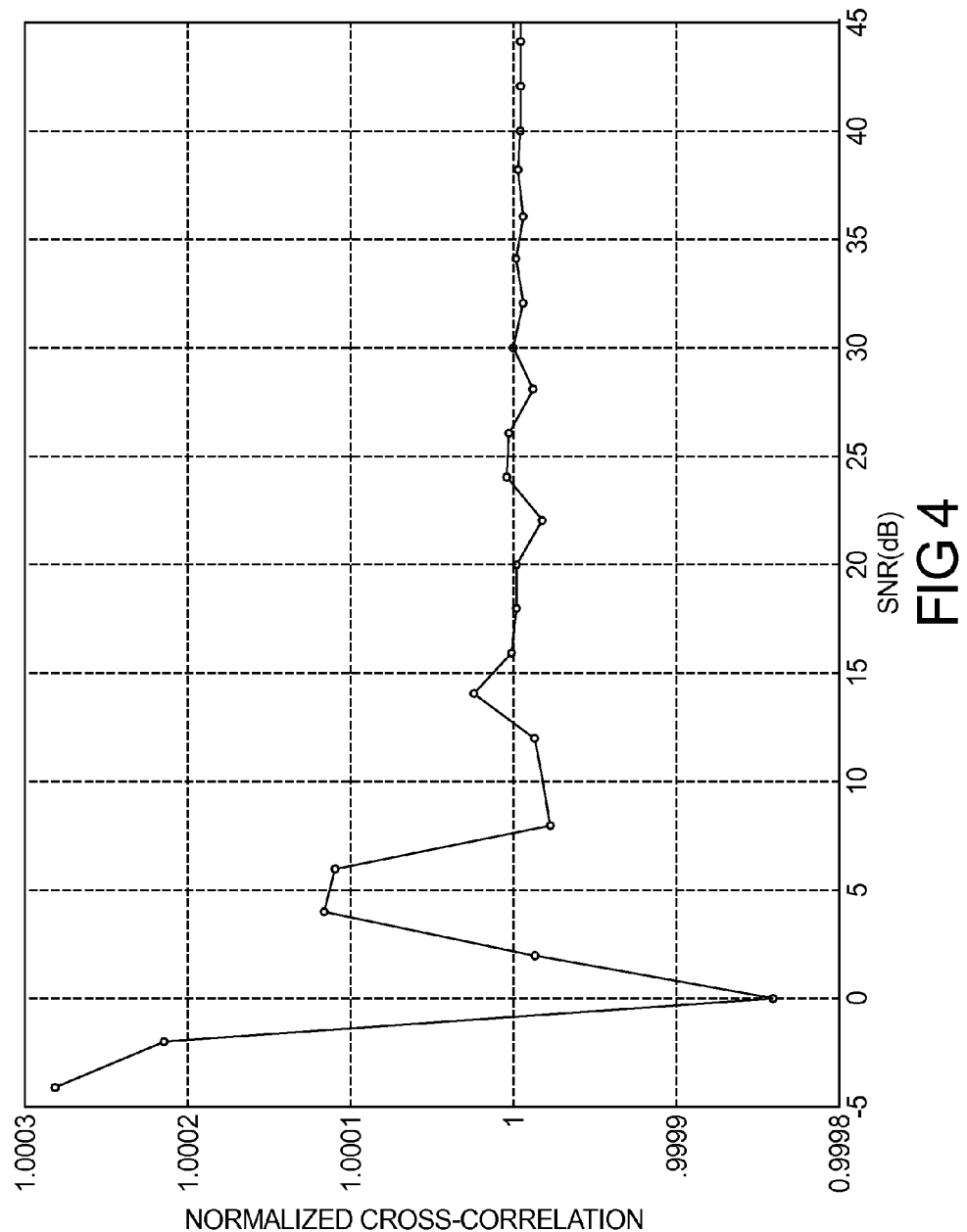
FIG. 4 is a view of a graph illustrating normalized cross-correlation between the reference signal and noisy versions of a primary user's signal where $\sigma^2_s=1$ for the method, according to the present invention, for defense against primary user emulation attacks in cognitive radio networks.

To illustrate the security of the AES-assisted DTV based on the avalanche effect, the cross-correlation between the reference signal and malicious signal under different SNR values is obtained, as shown in FIG. 3. It can be seen that the cross-correlation values are approximately zero, which implies that the malicious signal and the reference signal are uncorrelated. On the other hand, the cross-correlation between the reference signal and noisy versions of the primary signal is shown to be very high (around $\mu_1$ in equation (16)) under all SNR values, as illustrated in FIG. 4. It should be appreciated that in the system 10, the minimum SNR is 28.3 dB.

These results show that the AES-assisted DTV method of the present invention is secure under PUEAs, as malicious users cannot regenerate the reference signal in real time.

Mitigation of PUEA

The approaches proposed as previously described enable the secondary users to identify the primary signal, as well as malicious nodes. It should be appreciated that due to the large range of DTV channels, the malicious users would not be capable of jamming all DTV white spaces simultaneously. When a primary user emulation attack is detected, the secondary users can adopt different methodologies for effective transmission, such as:

Exploit techniques that are inherently jamming-resistant, such as Code Division Multiple Access (CDMA) and Frequency Hopping (FH) techniques. Both CDMA and FH were initially developed for secure military communications. CDMA is particularly efficient under narrow-band jamming, even if the malicious user hops from band to band. FH based systems are generally robust under wide-band jamming; when the malicious jamming pattern is time-varying, i.e., the malicious user switches between wide-band and narrow-band jamming, the transmitter then needs to be adjusted to combat the cognitive hostile attacks.

Avoid transmission on the white spaces jammed by malicious nodes. For example, consider the case where the benign secondary users are OFDM-based transceivers, then they can shape their transmitted signal through proper precoding design to avoid communication over the jammed subcarriers. For time-varying attacks, the precoder should be adapted accordingly for transmission. This necessitates that jamming detection needs to be performed in real-time, which can generally be achieved by evaluating the time-varying power spectrum of the jamming signal.

Using Energy Harvesting Techniques

PUEA is essentially a jamming interference for the secondary users (SUs). The performance of the SUs can be improved significantly by exploiting PUEA as an extra energy resource using the energy harvesting techniques. That is, each SU can perform information reception and energy harvesting simultaneously. The optimal power splitting ratio can be derived to maximize the sum-rate (i.e. the sum of the downlink data transmission rate and the uplink data transmission rate) for the SUs under PUEA.

Feasibility

It is practical to generate the required sync bits within the frame time duration shown in FIG. 1.

The AES process 22 is one of the block ciphers that can be implemented in different operational modes to generate stream data. In one embodiment, high-throughput (3.84 Gbps and higher) AES chips can be used. In one embodiment, an experiment was performed to measure the AES process 22 performance, where several file sizes from 100 KB to 50 MB were encrypted using a laptop with 2.99 GHz CPU and 2 GB RAM. Based on the results of the experiment, when the AES operates in the cipher feedback (CFB) mode, 554 bytes can be encrypted using 256-bit AES process 22 in 77.3 μs. Therefore, 2.99 GHz CPU can generate the required AES reference signal within the frame time duration. It should be appreciated that the TV stations generally have powerful processing units, hence it is not a problem to generate the required secure synchronization bits within the frame duration. With 3.84 Gbps encryption speed, for example, 39 KB can be encrypted in 77.3 μs, which is much more than needed.

Simulations

The effectiveness of the AES-assisted DTV method is demonstrated through simulation examples. First, the impact of the noise level on the optimal thresholds $\lambda_{0,opt}$ and $\lambda_{1,opt}$ is illustrated. Then, the false alarm rates and miss detection probabilities for both primary user and malicious user detection is evaluated. In the simulations, it is assumed that $s_i$, $m_i$, and $n_i$ are i.i.d. sequences, and are of zero mean. It is further assumed that the primary user is absent with probability $P_0$=0.25. The primary user's signal power is assumed to be normalized to $\sigma^2_s$=1. For malicious user detection, the false alarm constraint is set to $\delta=10^{-3}$.

Example 1

The optimal thresholds for malicious user detection. In this example, the optimal thresholds that minimize the miss detection probabilities under a predefined constraint on the false alarm rates for malicious user detection is demonstrated.

Figure 5:
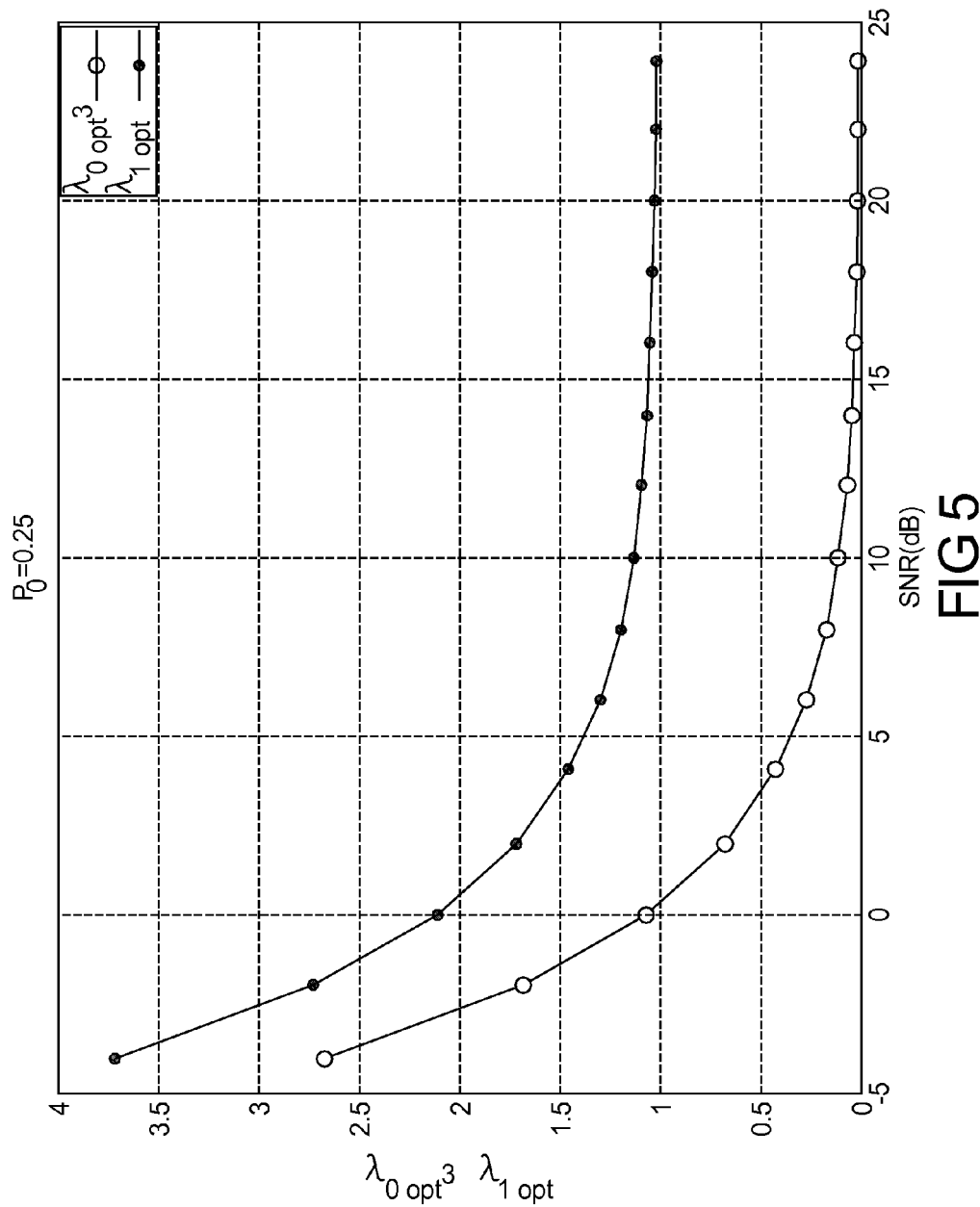
FIG. 5 is a view of a graph illustrating optimal thresholds for malicious user detection for $\delta=10^{-3}$, where $P_0=0.25$, for the method, according to the present invention, for defense against primary user emulation attacks in cognitive radio networks.

FIG. 5 shows the two optimal thresholds $\lambda_{0,opt}$ and $\lambda_{1,opt}$ versus SNR for $\delta=10^{-3}$. It is observed that the two curves decrease as the SNR increases, which can be verified with equations (49) and (50).

Example 2

False Alarm Rate and Miss Detection Probability for Primary User Detection

Figure 6A:
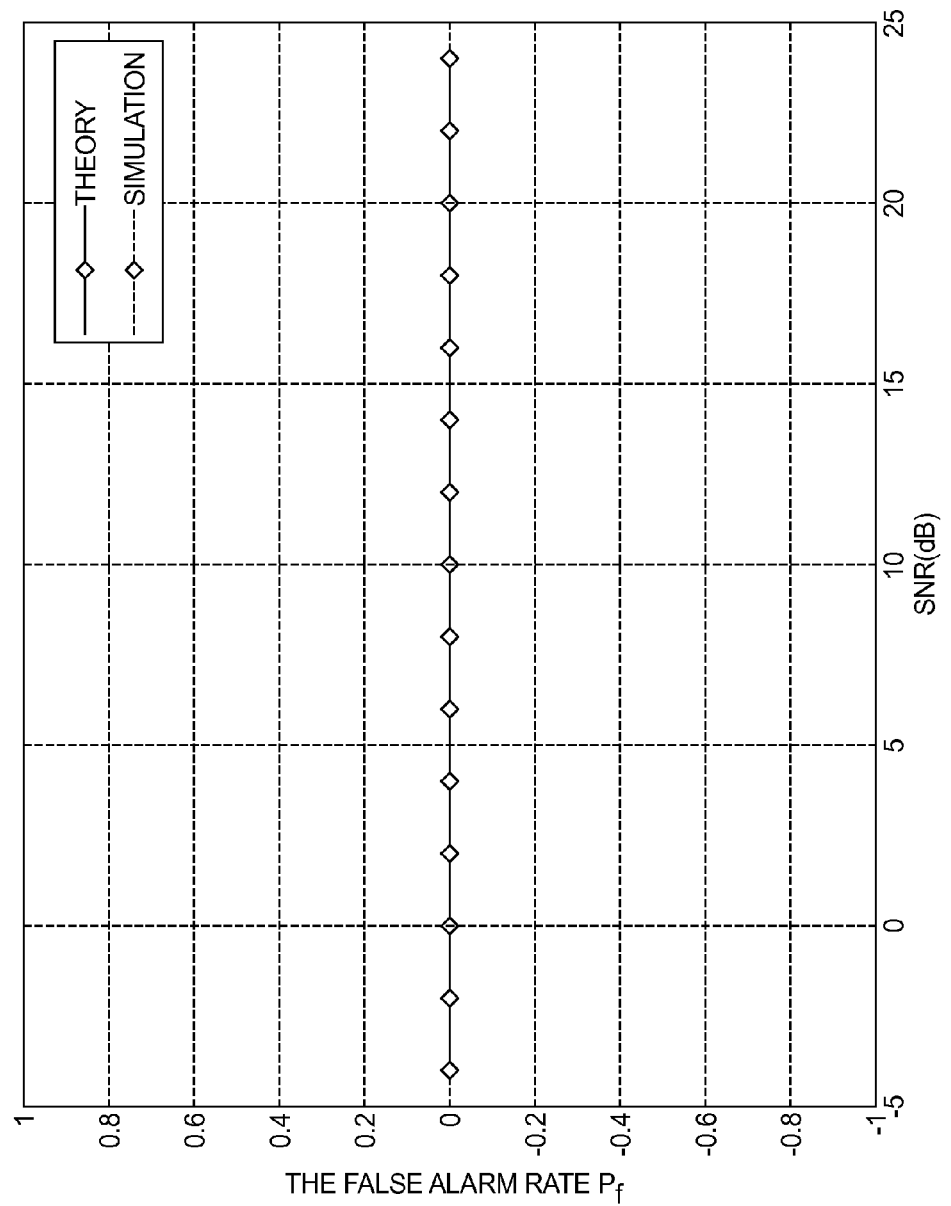

Using $\lambda=\sigma^2_s/2$, the false alarm rate and miss detection probability numerically is obtained and compared with the theoretical results. The false alarm rate is illustrated in FIG. 6(a). It is noted that the theoretical false alarm rate $P_f$ in equation (18) depends on β, since $\sigma^2_0$ is a function of β. However, based on equation (15) and the avalanche effect of the AES process 22, this dependency becomes negligible when N is large. This can be seen from FIG. 6(a) as the theoretical calculations match perfectly with the numerical simulations.

The probability of miss detection is shown in FIG. 6(b). It also can be seen that the theoretical calculations and numerical simulations are matched perfectly. It is clear that the AES-assisted DTV method of the present invention achieves zero false alarm rate and miss detection probability under a large range of SNR values.

Example 3

False Alarm Rate and Miss Detection Probability for Malicious User Detection

Figure 7A:
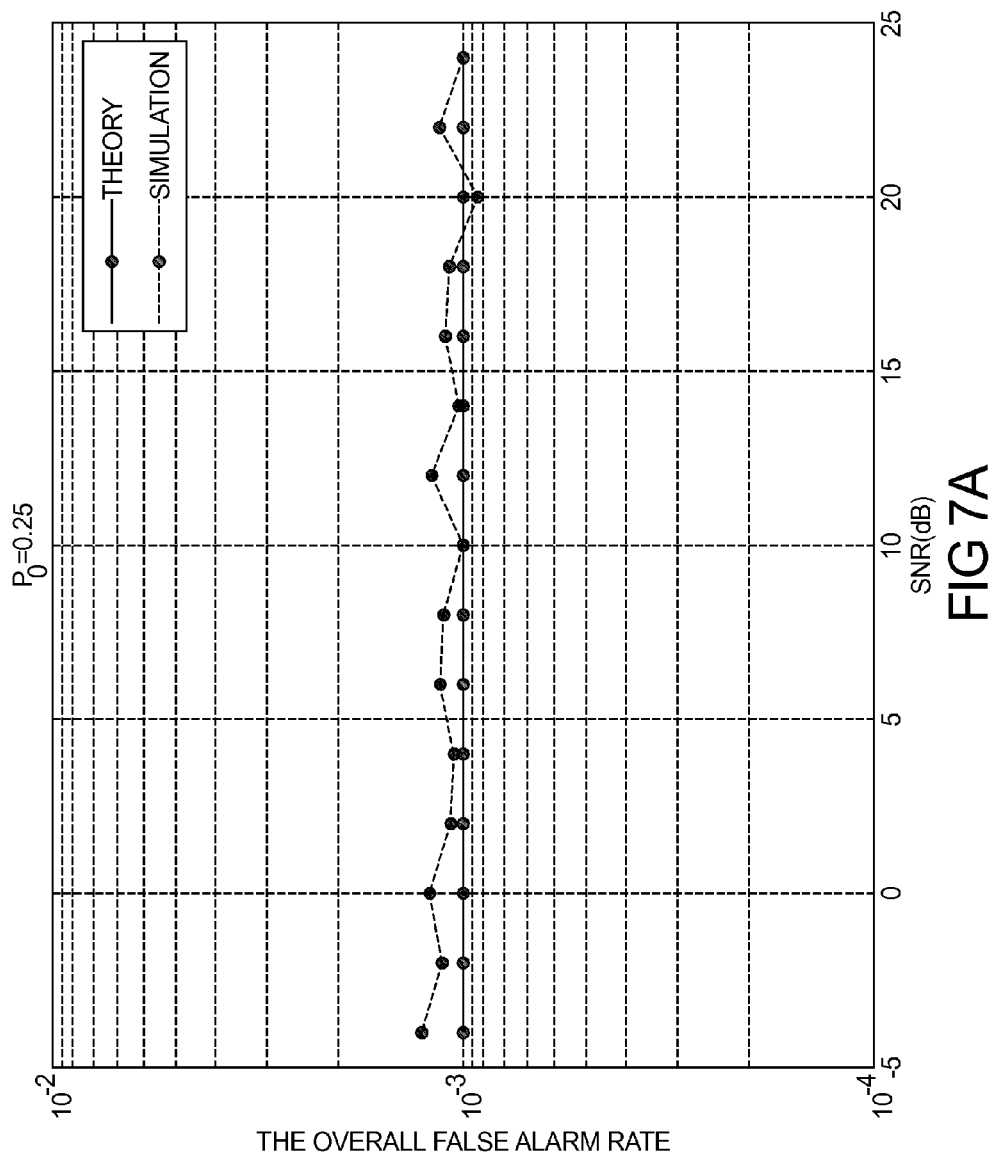
FIGS. 7(a) and 7(b) are diagrammatic views of an overall false alarm rate and overall miss detection probability for malicious user detection, respectively, of the method, according to the present invention, for defense against primary user emulation attacks in cognitive radio networks.

In this example, the overall false alarm rate and miss detection probability numerically is obtained and compared with the theoretical results. FIG. 7(a) shows the overall false alarm rate $P_f$ for $\delta=10^{-3}$. It should be appreciated that the theoretical calculations and numerical simulations are almost equal, and the predefined false alarm constraint δ is satisfied.

Figure 7B:
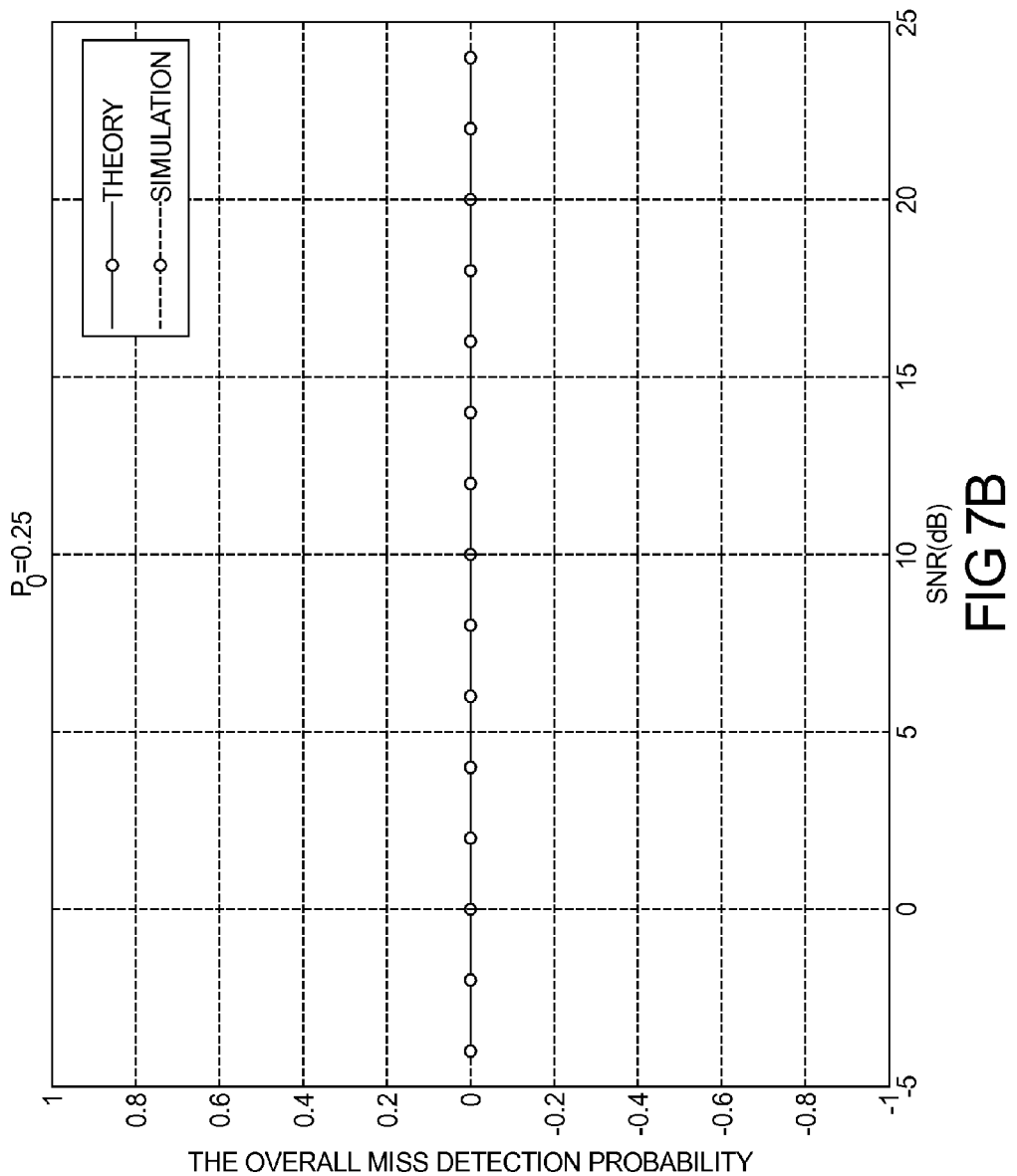

The overall miss detection probability $\tilde{P}_m$, is illustrated in FIG. 7(b). It is shown that the method of the present invention achieves zero overall miss detection probability under a large range of SNR values.

From the discussions above, it is concluded that the AES-assisted DTV method of the present invention can achieve very low false alarm rates and miss detection probabilities when detecting the primary user and malicious user. That is, with the AES-assisted DTV method of the present invention, primary user emulation attacks can be effectively combated. It should be appreciated that the theoretical calculations presented are consistent with the numerical simulations.

Feasibility for Second Generation DTV Standard

It should be appreciated that the method of the present invention can be applied directly to the $2^{nd}$ generation Orthogonal Frequency Division Multiplexing (OFDM) based DTV standard for more efficient spectrum sharing under PUEA. Currently, the most prevalent $2^{nd}$ generation terrestrial DTV standard is DVB-T2. With the OFDM structure used in DVB-T2, the present invention can accurately detect the presence of the malicious users over each 3-subcarrier sub-band where the P2 pilots present. It should be further appreciated that the present invention can be used to detect PUEA over each single subcarrier if the preamble P2 symbols in the DVB-T2 standard can be adjusted to cover every OFDM subcarrier. The AES encrypted pseudorandom sequence can be used to replace the P2 preamble symbols because their frequency locations are independent of the size of the Fast Fourier Transform (FFT) used, and they have the largest number among all pilot symbols.

Accordingly, a reliable AES-assisted DTV method of the present invention is disclosed for robust primary and secondary system operations under primary user emulation attacks. In the method of the present invention, an AES-encrypted reference signal is generated at the TV transmitter and used as the synchronization bits of the DTV data frames. By allowing a shared secret between the transmitter 12 and the receiver 14, the reference signal can be regenerated at the receiver 14 and be used to achieve accurate identification of authorized primary users. Moreover, when combined with the analysis on the auto-correlation of the received signal, the presence of the malicious user can be detected accurately no matter whether the primary user is present or not. The method of the present invention is practically feasible in the sense that it can effectively combat PUEA with no change in hardware or system structure except of a plug-in AES chip as shown in FIG. 2. It should be appreciated that the method of the present invention can be applied directly to today's HDTV systems for more robust spectrum sharing.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A method for defense against primary user emulation attacks in cognitive radio networks comprising the steps of:
   generating an advanced encryption standard (AES)-encrypted reference signal with a transmitter for transmitting to at least one receiver;
   allowing a shared secret between the transmitter and the at least one receiver;
   regenerating the reference signal at the at least one receiver and using the regenerated reference signal to achieve accurate identification of authorized primary users as well as malicious users;
   analyzing an auto-correlation of the received reference signal by the at least one receiver;
   detecting by the at least one receiver whether the primary user is present or not by comparing a cross-correlation between the received reference signal and a received signal to a predetermined threshold; and
   concluding that the primary user is present if the cross-correlation is greater than the predetermined threshold and concluding that the primary user is not present if the cross-correlation is less than the predetermined threshold.

2. A method as set forth in claim 1 wherein said step of generating comprises using an AES encrypted reference sequence as synchronization bytes of each digital television (DTV) data frame.

3. A method as set forth in claim 1 including the step of detecting the presence of a malicious user based on the auto-correlation analysis whether the primary user is present or not.

4. A method as set forth in claim 1 including the step of operating the authorized secondary users over white spaces of a digital TV (DTV) band.

5. A method as set forth in claim 1 including the step of generating a pseudo-random (PN) sequence using a Linear Feedback Shift Register (LFSR).

6. A method as set forth in claim 5 wherein said step of generating includes using a secure integration vector (IV) with the LFSR.

7. A method as set forth in claim 6 including the step of encrypting the PN sequence with an AES process.

8. A method as set forth in claim 7 including the step of using a maximum length sequence from the IV as an input to the AES process.

9. A method for defense against primary user emulation attacks in cognitive radio networks comprising the steps of:
   providing a transmitter for transmitting to at least one receiver;
   generating an advanced encryption standard (AES)-encrypted reference signal with the transmitter;
   allowing a shared secret between the transmitter and the at least one receiver;
   regenerating the reference signal at the at least one receiver and using the regenerated reference signal to achieve accurate identification of authorized primary users as well as malicious users;
   analyzing an auto-correlation of the received reference signal by the at least one receiver;
   detecting by the at least one receiver whether the primary user is present or not by comparing a cross-correlation between the received reference signal and a received signal to a predetermined threshold;
   concluding that the primary user is present if the cross-correlation is greater than the predetermined threshold and concluding that the primary user is not present if the cross-correlation is less than the predetermined threshold; and
   detecting the presence of a malicious user based on the auto-correlation analysis whether the primary user is present or not.

10. A method as set forth in claim 9 wherein said step of generating comprises using an AES encrypted reference sequence as synchronization bytes of each DTV data frame.

11. A method as set forth in claim 9 including the step of operating the authorized secondary users over white spaces of a digital TV (DTV) band.

12. A method as set forth in claim 9 including the step of generating a pseudo-random (PN) sequence using a Linear Feedback Shift Register (LFSR).

13. A method as set forth in claim 12 wherein said step of generating includes using a secure integration vector (IV) with the LFSR.

14. A method as set forth in claim 13 including the step of encrypting the PN sequence with an AES process.

15. A method as set forth in claim 14 including the step of using a maximum length sequence from the IV as an input to the AES process.

16. A method for defense against primary user emulation attacks in cognitive radio networks comprising the steps of:
   providing a transmitter and at least one receiver;
   generating an advanced encryption standard (AES)-encrypted reference signal by a primary user using an AES encrypted reference sequence as synchronization bytes of each DTV data frame with the transmitter and generating a pseudo-random (PN) sequence using a secure integration vector (IV) with a Linear Feedback Shift Register (LFSR);
   operating authorized secondary users over white spaces of a digital TV (DTV) band;
   allowing a shared secret between the transmitter and the at least one receiver;
   regenerating the reference signal at the at least one receiver with the shared secret;

analyzing an auto-correlation of the received reference signal by the at least one receiver;

detecting by the at least one receiver whether the primary user is present or not by comparing a cross-correlation between the received reference signal and a received signal to a predetermined threshold;

concluding that the primary user is present if the cross-correlation is greater than the predetermined threshold and concluding that the primary user is not present if the cross-correlation is less than the predetermined threshold; and detecting the presence of a malicious user based on the auto-correlation analysis whether the primary user is present or not.

\* \* \* \* \*